US012747693B1

(12) United States Patent
Ellis et al.

(10) Patent No.: US 12,747,693 B1
(45) Date of Patent: Sep. 29, 2026

(54) HEAT EXCHANGE SYSTEM TO TRANSFER WASTE HEAT FROM ELECTRICAL LOAD TO COMPRESSED AIR ENERGY STORAGE SYSTEM

(71) Applicant: BrightNight Power LLC, West Palm Beach, FL (US)

(72) Inventors: Erik Ellis, Phoenix, AZ (US); Milton James Venetos, Los Gatos, CA (US)

(73) Assignee: BrightNight Power LLC, West Palm Beach, FL (US)

( * ) Notice: Subject to any disclaimer, the term of this patent is extended or adjusted under 35 U.S.C. 154(b) by 0 days.

(21) Appl. No.: 19/553,188

(22) Filed: Feb. 27, 2026

Related U.S. Application Data

(60) Provisional application No. 63/786,476, filed on Apr. 10, 2025.

(51) Int. Cl.
*F02C 6/16* (2006.01)
*F28D 20/00* (2006.01)
*H02J 15/20* (2026.01)

(52) U.S. Cl.
CPC ................ *F02C 6/16* (2013.01); *F28D 20/00* (2013.01); *H02J 15/20* (2026.01)

(58) Field of Classification Search
CPC .............. F02C 6/16; F28D 20/00; H02J 15/20
See application file for complete search history.

(56) References Cited

U.S. PATENT DOCUMENTS 10,746,097 B2 8/2020 Kubo et al.
12,618,343 B2 * 5/2026 O'Donnell .............. F01K 13/00
2010/0024445 A1 * 2/2010 Cichanowicz ..... H05K 7/20727 62/86
2012/0036853 A1 2/2012 Kidd et al.
2015/0337691 A1 * 11/2015 Somani .............. H05K 7/20836 60/645

(Continued)

FOREIGN PATENT DOCUMENTS

CN 111140298 5/2020
WO WO-2024/075336 4/2024

OTHER PUBLICATIONS

Ahmed et al., "Technology Strategy Assessment Findings from Storage Innovations 2030 Compressed Air Energy Storage", Energy Earthshots U.S. Department of Energy, Jul. 2023.

(Continued)

*Primary Examiner* — Hoang M Nguyen
(74) *Attorney, Agent, or Firm* — Foley & Lardner LLP

(57) ABSTRACT

A system includes a renewable energy source (RES) configured to provide 100% carbon free electrical power and cooling without the need for chillers and evaporative cooling towers to a co-located data center, a compressed air energy storage (CAES) system including compressed air storage configured to store compressed air, a compressor train configured to receive electrical power from the RES to compress ambient air into the compressed air storage, and an expander train configured to decompress the compressed air from the compressed air storage to provide electrical power to the co-located data center, and a heat exchange system comprising a heat pump configured to transfer waste heat from the co-located data center to the expander train of the CAES system to heat the compressed air from the compressed air storage.

24 Claims, 3 Drawing Sheets

200

(56) References Cited

U.S. PATENT DOCUMENTS

| | | | | |
|---|---|---|---|---|
| 2019/0056152 A1* | 2/2019 | Matsukuma | .............. | F02C 6/00 |
| 2021/0325069 A1* | 10/2021 | Cotton | .................... | F24D 10/00 |
| 2025/0226671 A1* | 7/2025 | Reynolds | ................ | C25B 15/02 |
| 2026/0094732 A1* | 4/2026 | Haase | ...................... | G21D 1/00 |

OTHER PUBLICATIONS

Kavehpour et al., "High-Temperature Hybrid Compressed Air Storage: Ultra-Low-Cost Energy Storage System Alternative to Batteries", Energy Research and Development Division, Feb. 2018.

* cited by examiner

HEAT EXCHANGE SYSTEM TO TRANSFER WASTE HEAT FROM ELECTRICAL LOAD TO COMPRESSED AIR ENERGY STORAGE SYSTEM

CROSS-REFERENCE TO RELATED APPLICATION(S)

This application claims the benefit of priority to U.S. Provisional Application No. 63/786,476, filed Apr. 10, 2025, the disclosure of which is incorporated herein by reference.

BACKGROUND

Compressed air energy storage (CAES) and Liquid Air Energy Storage (LAES) systems have emerged as a promising technologies for large-scale energy storage. These systems utilize off-peak or excess electricity to compress or liquify air, which is then stored in underground caverns or above-ground tanks. When electricity demand increases, the compressed or liquified air is heated, released, and expanded through turbines to generate power.

The heating of compressed or liquified air before expansion is necessary due to thermodynamic principles governing the behavior of gases. When air is compressed, its temperature increases. However, during storage, this heat is typically lost to the surrounding environment. If the compressed air were to be expanded without reheating, it would experience significant cooling, potentially reaching temperatures well below freezing. This extreme cooling may lead to several issues: 1) formation of ice within the expansion turbines, which can damage equipment and reduce efficiency, 2) decreased energy output from the expansion process, as colder air has less internal energy to convert to mechanical work, and 3) reduced volumetric expansion of the air, limiting the power generation capacity of the turbines. By reheating the compressed air before expansion, the system may 1) increase the energy content of the air, allowing for greater power generation, 2) prevent the formation of ice and other low-temperature related issues in the turbines, 3) enhance the overall efficiency of the energy conversion process, and 4) enable more complete expansion of the air, maximizing the utilization of the stored energy. In some cases, the heating process may also serve to optimize the air temperature for the specific design and operating parameters of the expansion turbines, potentially improving their performance and longevity.

Traditional CAES systems, known as diabatic systems, typically use natural gas combustion to heat the compressed air before expansion. While effective, this approach reduces overall system efficiency and produces greenhouse gas emissions. To address these limitations, researchers and engineers have explored adiabatic CAES systems that recover and store the heat generated during compression, using it later to reheat the air before expansion. Adiabatic CAES systems may offer improved efficiency and reduced environmental impact compared to their diabatic counterparts. However, challenges may remain in optimizing heat recovery, storage, and transfer processes. The temperature and pressure differentials involved can be substantial, potentially requiring careful design of heat exchangers and thermal storage systems. In some aspects, adiabatic CAES systems may incorporate thermal energy storage technologies such as molten salt tanks, phase change materials, or solid media heat storage. These thermal storage solutions may allow the system to capture and retain the heat generated during compression for extended periods, enabling its use during the expansion phase without relying on external fuel sources.

Adiabatic CAES systems offer improved efficiency and reduced environmental impact compared to their diabatic counterparts. Adiabatic CAES systems may involve complex configurations of heat exchangers, thermal storage units, and control systems to effectively capture, store, and utilize the heat generated during compression, potentially requiring sophisticated engineering solutions to optimize performance across varying operational conditions and time scales.

BRIEF DESCRIPTION OF FIGURES

Non-limiting and non-exhaustive examples are described with reference to the following figures.

DETAILED DESCRIPTION

The following description sets forth exemplary aspects of the present disclosure. It should be recognized, however, that such description is not intended as a limitation on the scope of the present disclosure. Rather, the description also encompasses combinations and modifications to those exemplary aspects described herein.

Figure 1:
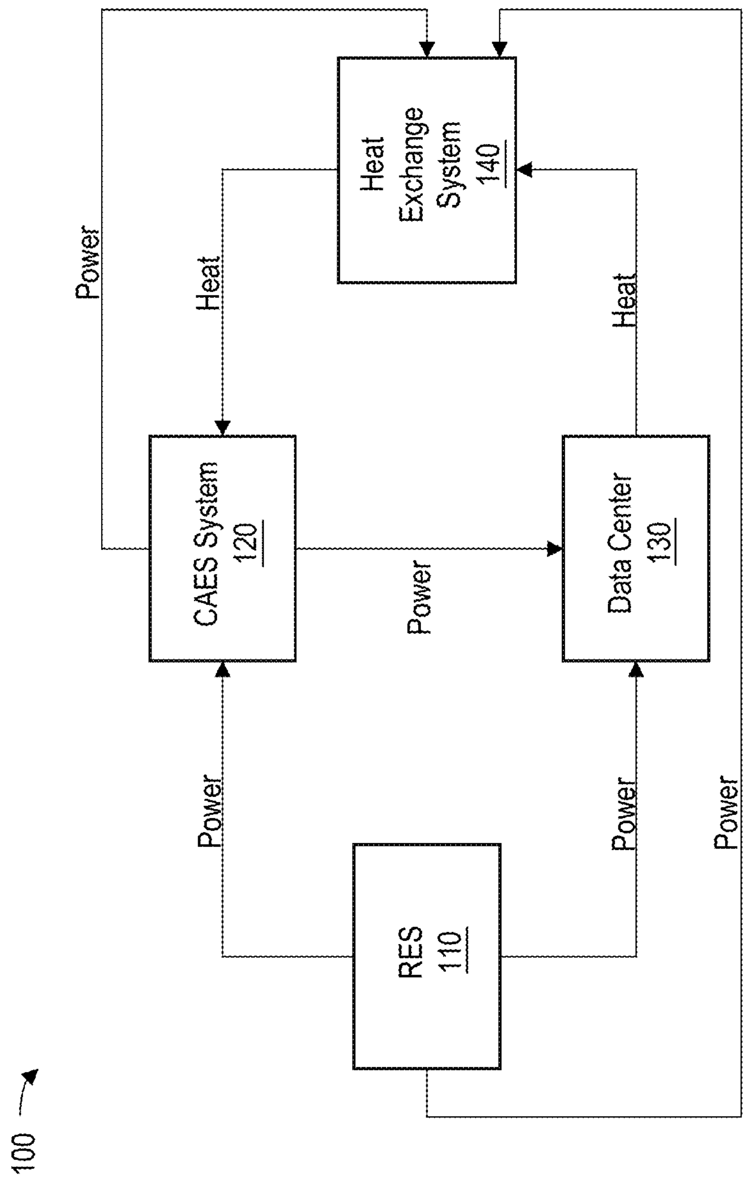
FIG. 1 is a block diagram of an example system for storing energy from a renewable energy source (RES) using a compressed air energy storage (CAES) system to provide continuous power to a co-located data center and using a heat exchange system to transfer waste heat from the data center to the CAES system.

FIG. 1 is a block diagram of an example system 100 for storing energy from a renewable energy source (RES) 110 using a compressed air energy storage (CAES) system 120 to provide continuous power to a co-located data center 130 and using a heat exchange system 140 to transfer waste heat from the data center 130 to the CAES system 120. The data center 130 may be physically situated in close proximity to both the renewable energy source 110 and the CAES system 120, allowing for efficient energy transfer and reduced transmission losses. This co-location arrangement may enable direct power delivery from the RES 110 and CAES system 120 to the data center 130, while also facilitating the transfer of waste heat from the data center 130 to the CAES system 120 through the heat exchange system 140.

The renewable energy source 110 may be configured to provide electrical power to the co-located data center 130. In some cases, the renewable energy source 110 may include solar panels, wind turbines, or a combination thereof. The renewable energy source 110 may be sized to provide surplus power beyond the immediate needs of the data center 130.

The CAES system 120 may include compressed air storage, a compressor train, and an expander train. The compressor train may be configured to receive electrical power from the renewable energy source 110 to compress ambient air into the compressed air storage. The expander train may be configured to decompress the compressed air from the compressed air storage to provide electrical power to the co-located data center 130. While the term "compressed air" is used for illustrative purposes, liquefied air may also be used. While a CAES system is described for convenience, other types of energy storage systems may also be used, such as chemical batteries, lithium-ion batteries, iron batteries, capacitors, and other energy storage systems.

The heat exchange system 140 may include a heat pump configured to transfer waste heat from the co-located data center 130 to the expander train of the CAES system 120. Heat pumps may operate by transferring thermal energy from a lower temperature source to a higher temperature sink, effectively moving heat against its natural flow direction. In some aspects, heat pumps utilize a refrigeration cycle, where a working fluid undergoes phase changes to absorb and release heat. The process may involve four main components: an evaporator, a compressor, a condenser, and an expansion valve. As the working fluid circulates through these components, it may absorb heat from the source, get compressed to raise its temperature, release heat to the sink, and then expand to lower its pressure and temperature before the cycle repeats. Heat pumps may be reversible, allowing them to provide both heating and cooling functions depending on the direction of heat transfer. In some implementations, the heat pump may transfer heat from ambient (ambient air or geothermal) to the expander train of the CAES system 120. In an example, the heat pump transfers heat from the data center 130 and ambient air to the expander train of the CAES system 120.

This transfer of heat from the data center 130 to the CAES system 120 may serve two purposes: providing heat for effective power generation by the CAES system 120 while simultaneously reducing or satisfying cooling demands of the data center 130. Doing so also saves the water that a conventional wet cooled chiller system would consume or the additional electricity that a dry cooled chiller system would consume. The heat exchange system 140 may upgrade the heat from the data center 130 in transferring the heat to the CAES system 120. Upgrading the heat refers to collecting the heat at a lower temperature and delivering the heat at a higher temperature. The heat exchange system 140 may utilize a thermodynamic cycle to elevate the temperature of the heat collected from the data center 130, allowing it to deliver thermal energy at a higher temperature to the CAES system 120, potentially increasing the usability and efficiency of the transferred heat for power generation and preventing ice formation during the expansion process.

In some cases, the data center 130 may be substituted with other industrial loads that produce waste heat. Examples of such industrial loads may include: 1) manufacturing facilities, such as steel mills, aluminum smelters, or glass production plants, 2) chemical processing plants, 3) oil refineries, 4) food processing facilities, 5) textile manufacturing plants, 6) pulp and paper mills, 7) semiconductor fabrication plants, 8) large-scale cryptocurrency mining operations, 9) desalination plants, 10) large-scale refrigeration and cold storage facilities, 11) cement production plants, 12) automotive manufacturing facilities, 13) plastics and polymer production plants, 14) pharmaceutical manufacturing facilities, 15) industrial-scale 3D printing operations, and 16) carbon capture and storage systems. These industrial loads may generate significant amounts of waste heat as a byproduct of their operations. In some aspects, integrating these loads with a CAES system 120 and heat exchange system 140 may allow for more efficient use of energy and improved overall system performance. In addition, these industrial loads may also be able to utilize the heat from compression in the CAES system 120. In this way, heat that might otherwise be rejected can be utilized by an industrial load.

The renewable energy source 110 and the CAES or LAES system 120 may coordinate generation and storage of power to provide continuous, carbon-free electrical power to the data center 130 with very high reliability. In some cases, the renewable energy source 110 may be overbuilt to charge the compressed air storage while simultaneously powering the data center 130. The CAES plant may be overbuilt, too, to provide high reliability. In some aspects, the renewable energy source 110 may generate power in excess of the immediate demand from the data center 130. This surplus power may be utilized by the CAES system 120 to compress ambient air and store it in the compressed air storage, potentially for days and weeks of reserve. The compressor train of the CAES system 120 may operate during periods of excess renewable energy generation, converting electrical energy into potential energy in the form of compressed air. This stored compressed air may then be used later when renewable energy generation is insufficient to meet the data center's power demands. By leveraging this energy storage capability, the system 100 may balance fluctuations in renewable energy production and data center power consumption, potentially enabling more consistent and reliable operation. The system may be enhanced by a battery to smoothly transition from the renewable plant and the CAES plant.

The system 100 may operate independently from the grid and/or gas infrastructure or in grid-connected mode. The system 100 may provide a sustainable and efficient solution for powering data centers or other electrical loads with carbon-free electrical energy and little or no water use for rejecting heat from the load's cooling loop(s). It may also export excess power to the grid for months when there is a surplus of energy.

Electrical power can be provided by the RES 110 and the CAES system 120 to the data center 130 and/or the heat exchange system 140. The RES 110 may generate electrical power, which can be distributed to the data center 130, the CAES system 120, and/or the heat exchange system 140. The data center 130 may receive power from the RES 110 and/or the CAES system 120. In an example, the data center 130 receives power directly from the RES 110 when a power output of the RES 110 is equal to or greater than a demand of the data center 130 and from the CAES system 120 when the power output of the RES 110 output is less than the demand of the data center 130. Power from the RES 110 may be used to drive the compressor train of the CAES system 120, converting electrical energy into potential energy stored as compressed air. In some implementations, excess power from the RES 110 (in excess of a demand of the data center 130) is used to drive the compressor train of the CAES system 120. The heat exchange system 140 may require electrical power to operate, which could be supplied by either the RES 110 or the CAES system 120. In an example, a portion of power generated by the CAES system 120 is provided to the data center 130 and another portion is provided to the heat exchange system 140.

The data center 130 generates waste heat as a byproduct of its operations (e.g., computing) which the heat exchange system 140 transfers form the data center 130 to the CAES system 120. In the expander train of the CAES system 120, this transferred heat may be used to warm the compressed air before or during expansion, to improve the efficiency of power generation. By removing waste heat from the data center 130, the heat exchange system 140 may simultaneously reduce the cooling load of the data center 130. In an example, the data center 130 has a smaller cooling system than would normally be required to maintain operating temperatures of the data center 130. In an example, the heat exchange system 140 draws sufficient amounts of heat from the data center 130 to replace the cooling system of the data center 130 such that the data center 130 does not include a cooling system.

Figure 2:
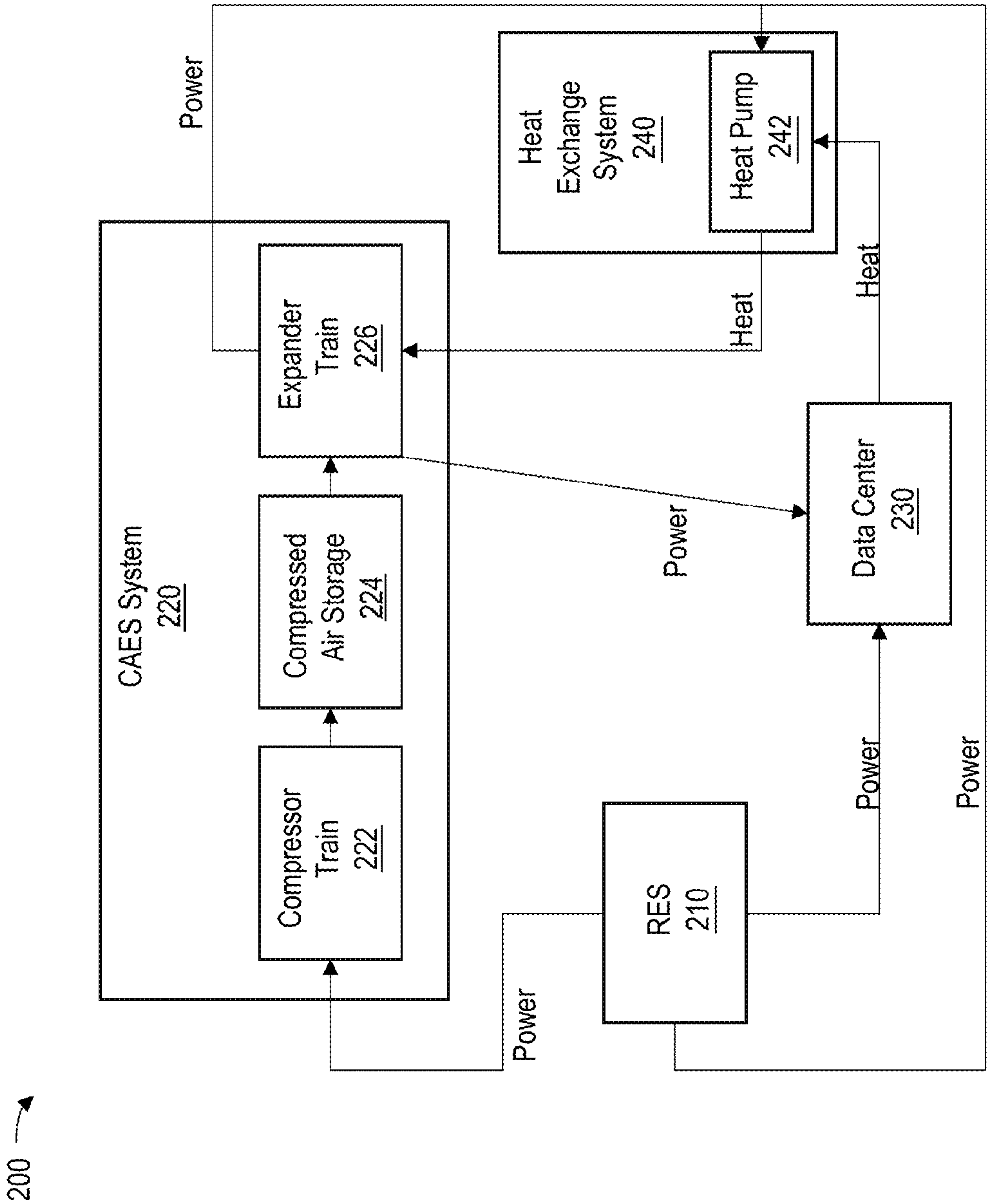
FIG. 2 is a block diagram of an example system for storing energy from an RES using a CAES system to provide continuous power to a co-located data center and using a heat exchange system to transfer waste heat from the data center to an expander train of the CAES system.

FIG. 2 is a block diagram of an example system 200 for storing energy from an RES 210 using a CAES system 220 to provide continuous power to a co-located data center 230 and using a heat exchange system 240 to transfer waste heat from the data center 230 to an expander train 226 of the CAES system 220.

The CAES system 220 comprises internal components including a compressor train 222, a compressed air storage 224, and an expander train 226. The compressor train 222 may receive electrical power from the RES 210 to compress ambient air into the compressed air storage 224. In some cases, the compressed air storage 224 may comprise one or more of a subterranean cavern, compressed air tanks, and liquid air tanks. In some implementations, the compressed air storage 224 may include a subterranean salt cavern, a depleted oil well, or other subterranean cavern. Existing spaces, such as former salt mining sites, may be used for convenience. Other spaces for storing compressed or liquefied air may also be used as the compressed air storage 224.

The RES 210 may include a diverse mix of renewable energy sources to enhance reliability and consistency of power generation. For instance, it may combine solar photovoltaic panels, wind turbines, and hydroelectric generators. This diversity may help to mitigate the intermittency issues associated with individual renewable energy sources.

The expander train 226 may decompress the compressed air from the compressed air storage 224 to provide electrical power to the data center 230. As discussed above, while a data center 230 is illustrated for explanatory purposes, any electrical load that produces waste heat may be substituted for the data center 230. The compressor train 222 may include low-pressure, medium-pressure, and high-pressure compression stages. Similarly, the expander train 226 may include high-pressure, medium-pressure, and low-pressure expansion stages. This multi-stage approach may allow for more efficient compression and expansion processes.

The heat exchange system 240 includes a heat pump 242 configured to transfer waste heat from the data center 230 to the expander train 226 of the CAES system 220. The heat exchange system 240 may incorporate additional elements apart from the heat pump 242 to facilitate the exchange or transfer of heat from the data center 230 to the expander train 226. In an example, the heat exchange system 240 can include shell and tube heat exchangers, plate heat exchangers, or regenerative heat exchangers. In some cases, the system 200 may use a combination of different heat exchanger types to optimize heat transfer at various points in the process. The heat pump 242 may upgrade the heat from the data center 230 in transferring the heat to the expander train 226. Upgrading the heat refers to collecting the heat at a lower temperature and delivering the heat at a higher temperature. The heat pump 242 may utilize a thermodynamic cycle to elevate the temperature of the heat collected from the data center 230, allowing it to deliver thermal energy at a higher temperature to the expander train 226, potentially increasing the usability and efficiency of the transferred heat for power generation and preventing ice formation during the expansion process.

In some implementations, the heat pump 242 can also transfer heat from ambient (air and/or geothermal) to the expander train 226. In an example, the heat pump 242 transfers heat from the data center 230 and ambient air to the expander train 226. In an example, the heat pump 242 transfers and upgrades heat from the data center 230 when the data center 230 is producing waste heat to run the expander train 226, and can transfer and upgrade heat from the ambient air or other sources if available and advantageous.

The transfer of heat from the data center 230 to the expander train 226 may provide heat for effective power generation by the expander train 226 while simultaneously reducing cooling demands of the data center 230. The heat transferred from the data center 230 to the expander train 226 by the heat pump 242 can heat the compressed air for expansion for use in power generation. The expander train 226 can be comprised of turbomachinery that may be damaged by ice crystals or which operates more effectively with air that is above freezing temperature (0 degrees Celsius). In some implementations, the data center 230 generates greater waste heat than is needed to heat the compressed air at the expander train 226. The excess heat removed from the data center 230 by the heat pump 242 can be transferred to ambient air, stored in thermal storage, and/or provided to a heat load. In some implementations, the compressed air storage 224 may provide compressed or liquified air to the data center 230 to cool the data center 230, such as when the renewable power plant is providing all of the data center power needs. This direct cooling using compressed air may supplement or replace traditional cooling methods, potentially improving overall system efficiency.

The RES 210 and the CAES system 220 may coordinate generation and storage of power to provide continuous, carbon-free electrical power to the data center 230. In some implementations, the RES 210 may generate power in excess of the immediate demand from the data center 230. This surplus power may be utilized by the compressor train 222 to compress ambient air and store it in the compressed air storage 224. The compressed air storage 224 may store the electrical energy from the RES 210 as potential energy. The compressed air storage 224 may be capable of long-term storage of energy. In some aspects, the system 200 may incorporate energy management software that uses predictive algorithms to optimize the operation of the RES 210, CAES system 220, and data center 230. This software may take into account factors such as weather forecasts, historical energy usage patterns, and real-time energy prices to make decisions about when to store energy and when to release it.

In some cases, the compressor train 222 may be sized differently than the expander train 226 (i.e., there is asymmetry between the capacities of the compressor train 222 and the expander train 226). The compressor train 222 being sized differently than the expander train 226 means that the capacity or ability of the compressor train 222 to compress air may be different than the capacity or ability of the expander train 226 to decompress air to generate power. This sizing difference may allow for optimization of the system 200 based on factors such as renewable energy availability, data center power demands, and thermal management requirements. the compressor train 222 can be sized differently than the expander train 226, as the compressor train 222 is decoupled from the expander train 226, or the heat generated by the compressor train 222 is not used by the expander train 226. Thus, the compressor train 222 and the expander train 226 can be different sizes to provide different amounts of power or direct cooling. In an example, the compressor train 222 has greater capacity than the expander train 226 such that compressed air is available for direct cooling in excess of what the expander train 226 can use for power generation. In an example, the expander train 226 has greater capacity than the compressor train 222 such that air can be slowly compressed over time by the compressor train 222 and quickly decompressed by the expander train 226 to generate large amounts of power.

Figure 3:
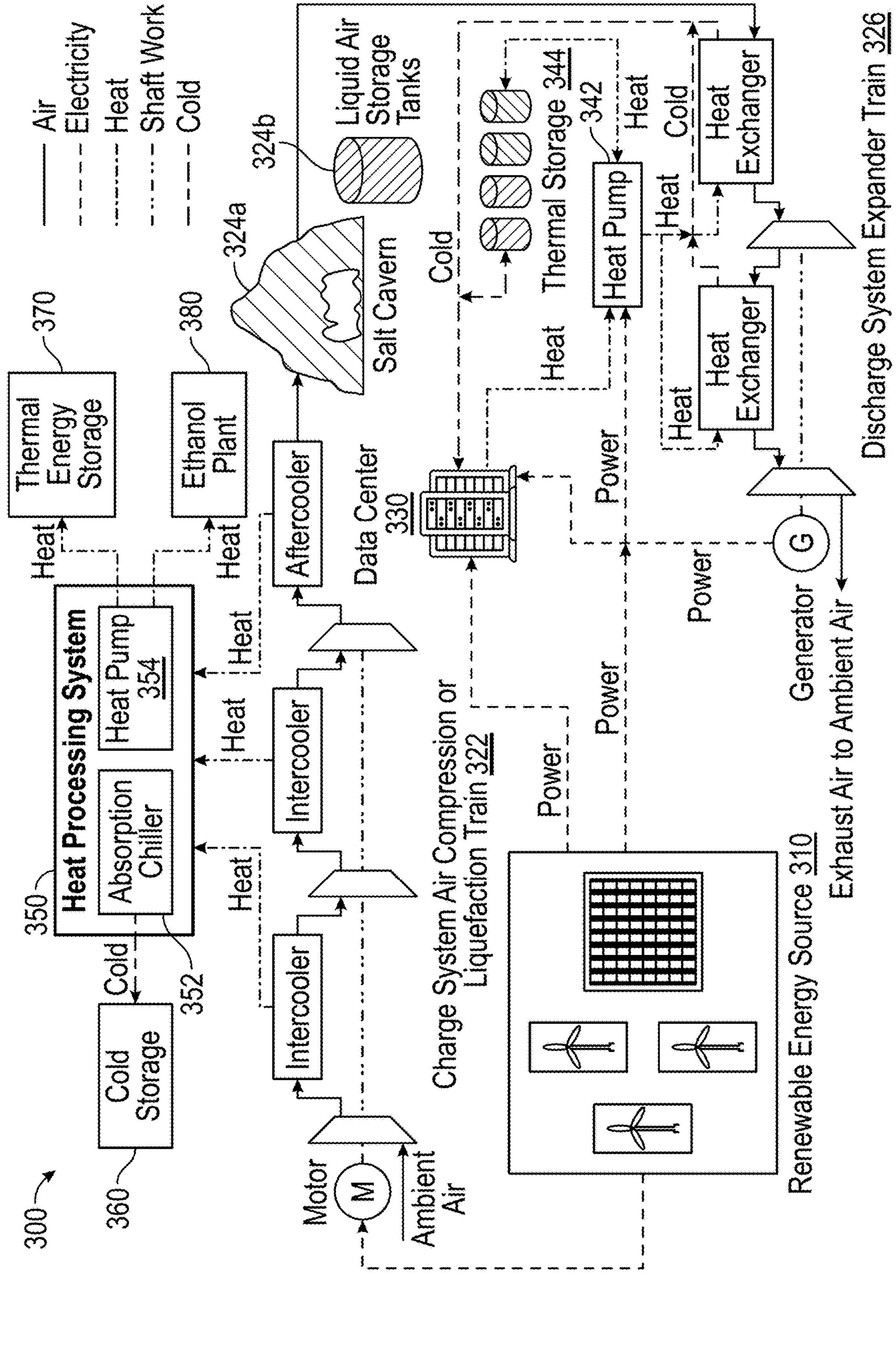
FIG. 3 is a block diagram of an example system for providing continuous electrical power to a data center using a co-located RES and CAES system, where waste heat from the data center is upgraded via a heat pump and provided to the CAES system.

FIG. 3 is a block diagram of an example system 300 for providing continuous electrical power to a data center 330 using a co-located RES 310 and CAES system, where waste heat from the data center 330 is upgraded via a heat pump and provided to the CAES system. The CAES system and RES 310 may serve a data center 330 or other industrial load. While a data center 330 is illustrated for explanatory purposes, any electrical load that produces waste heat may be substituted for the data center 330.

The renewable energy source (RES) 310 may include a variety of renewable power sources to provide a diverse and reliable energy supply. In some implementations, the RES 310 may incorporate solar photovoltaic (PV) panels, which can convert sunlight directly into electricity. These panels may be installed on rooftops, mounted on the ground, or integrated into other structures. Wind turbines may also be part of the RES 310, harnessing wind energy to generate power. These turbines may vary in size and capacity, from small-scale units suitable for distributed generation to large utility-scale turbines. In some cases, offshore wind farms may be connected to the system 300 to take advantage of stronger and more consistent wind resources. Hydroelectric generators may be included in the RES 310, utilizing the energy of flowing or falling water to produce electricity. This may involve conventional dams, run-of-river systems, or pumped storage facilities. In some implementations, small-scale hydroelectric systems may be integrated into existing water infrastructure. The RES 310 may also incorporate geothermal power plants, which tap into the Earth's heat to generate electricity. These plants may use various technologies such as dry steam, flash steam, or binary cycle systems, depending on the characteristics of the geothermal resource. Biomass energy systems may be part of the RES 310, converting organic materials into electricity through direct combustion, gasification, or anaerobic digestion processes. These systems may utilize agricultural residues, forestry byproducts, or dedicated energy crops. In some implementations, the RES 310 may include ocean energy technologies such as tidal power systems or wave energy converters.

The renewable energy source 310 and the CAES system may coordinate generation and storage of power to provide continuous, carbon-free electrical power to the data center 330. In some implementations, the renewable energy source 310 may generate power in excess of the immediate demand from the data center 330. This surplus power may be utilized by a compressor train 322 of the CAES system to compress or liquify ambient air and store it in a salt cavern 324*a* or storage tanks 324*b* of the CAES system.

The compressor train 322 may receive ambient air and compress it through multiple stages. The compressed air may pass through intercoolers between compression stages, where heat may be extracted. The compressed air can be stored in either a salt cavern 324*a* or storage tanks 324*b*. In some cases, the storage tanks 324*b* may contain liquefied air. Potential energy is stored in the compressed air or liquefied air. Salt caverns may be utilized for compressed air storage due to their large volume capacity, natural insulation properties, and ability to maintain high pressures, potentially allowing for efficient and cost-effective long-term storage of compressed air in geological formations. In some implementations, the system may utilize liquefied air instead of or in addition to compressed air. Liquefied air may offer higher energy density compared to compressed air, potentially allowing for more compact storage solutions. The use of liquefied air may also provide additional flexibility in terms of energy management and distribution, as it can be transported more easily than compressed air in some cases. Additional working fluids can also be used, apart from compressed air and liquefied air.

When needed, the compressed air may flow through an expander train 326 of the CAES system to generate electrical power through a generator. The expander train 326 may decompress or expand the air through multiple stages to drive a turbine and generate power using a generator. The expander train 326 may exhaust expanded air to the ambient environment after power generation.

The expander train 326 may incorporate multiple stages of expansion to optimize power generation and efficiency. In some implementations, the expander train 326 may include high-pressure, medium-pressure, and low-pressure expansion stages. Each stage may be designed to handle specific pressure ranges and expand the compressed air progressively. Between expansion stages, the expander train 326 may incorporate heat exchangers to manage the temperature of the expanding air. These heat exchangers may transfer thermal energy from external sources (such as waste heat from the data center 330) to reheat the air before it enters the next expansion stage. This reheating process may help maintain the air temperature above the freezing point, preventing ice formation and potential damage to turbine components. The reheating may improve an efficiency of the expander train 326, ensuring optimal temperature for each stage of the expander train 326 and improving power generation efficiency of the expander train 326. The heat exchangers in the expander train 326 may take various forms, such as shell-and-tube, plate, or regenerative designs. In some cases, a combination of different heat exchanger types may be employed to optimize heat transfer at various points in the expansion process.

A heat pump 342 may transfer waste heat from the data center 330 to the expander train 326 of the CAES system. This transfer of heat may serve two purposes: providing heat for effective power generation by the expander train 326 while simultaneously reducing cooling demands of the data center 330. In some cases, the heat pump 342 may additionally use ambient air or a geothermal source as a heat source. The heat pump 342 may transfer heat from the data center 330 and/or ambient to the heat exchangers of the expander train 326. The heat pump 342 may provide different amounts of heat to the different heat exchangers, depending on their specific characteristics and functions. The heat pump 342 may upgrade the heat from the data center 330 in transferring the heat to the expander train 326. Upgrading the heat refers to collecting the heat at a lower temperature and delivering the heat at a higher temperature. The heat pump 342 may utilize a thermodynamic cycle to elevate the temperature of the heat collected from the data center 330, allowing it to deliver thermal energy at a higher temperature to the expander train 326, potentially increasing the usability and efficiency of the transferred heat for power generation and preventing ice formation during the expansion process.

While a CAES system is described for convenience, other types of energy storage systems may also be used, such as chemical batteries, lithium-ion batteries, iron batteries, capacitors, and other energy storage systems. In some implementations, a liquid air energy storage (LAES) system is used in places of the CAES system. In the LAES system, the compressor train 322 may be a liquefier train, where air is compressed to the point that it transitions state from gas to liquid. In the LAES system, the liquid air may be stored in the liquid air storage tanks 324*b*. In the LAES system, the liquid air may be decompressed in the expander train 326 to drive a turbine and generate electrical power. The LAES system may operate similar to the CAES system and receive heat at the expander train 326 to prevent ice crystal formation and increase an efficiency of power generation. A LAES system may have certain advantages over a CAES system. In an example, a LAES system may use the liquid air storage tanks 324*b* without the salt cavern 324*a* or other subterranean cavern, allowing the system 300 to be located in a site without the salt cavern 324*a* or other subterranean cavern. CAES systems and LAES systems can be referred to generally as air energy storage (AES) systems. In AES systems, compressed air or liquid air can be referred to as high-potential air, meaning air that has higher potential energy than uncompressed air at ambient temperature. AES systems can include high-potential air storage to store compressed air or liquid air, as well as energy converters to convert electrical energy or kinetic energy into potential energy by compressing or liquifying air (e.g., compressor train) or to convert potential energy into electrical energy or kinetic energy using expansion of compressed air or liquid air (e.g., expander train). Thus, compressor trains and expander trains in CAES systems and condensers and expanders in LAES can be referred to severally as energy converters which function to convert energy from electrical energy to potential energy or vice versa.

The system 300 may include a thermal storage 344 that can work in conjunction with the heat pump 342 to manage thermal energy flows from the data center 330. The heat pump 342 may transfer waste heat from the data center 330 to the thermal storage 344, providing a buffer for thermal energy and allowing for more flexible operation of the overall system 300. the thermal storage 344 can store heat provided by the heat pump 342 for later use. The heat pump 342 can transfer heat from the thermal storage 344 to the expander train 326, or the heat exchangers of the expander train 326 as needed.

In some implementations, the thermal storage 344 includes a thermal transfer medium with high thermal capacity, such as water, phase change materials, or specialized thermal fluids. The heat pump 342 may extract heat from the data center 330 and transfer it to the thermal transfer medium, raising its temperature. This stored thermal energy can then be used later as needed, either for heating the compressed air in the expander train 326 or for other purposes within the system 300. In some implementations, the thermal storage 344 stores waste heat generated by the data center 330 in excess of what is needed to heat compressed air at the expander train 326. In an example, the heat pump 342 heats water within the thermal storage 344 when the data center 330 generates more heat than is needed at the expander train 326 and draws heat form the water of the thermal storage 344 when the data center 330 generates less heat than is needed at the expander train 326. In this way, the thermal storage 344 functions as a buffer such that the heat pump 342 can provide heat to the expander train 326 independent of when the data center 330 generates waste heat.

The thermal storage 344 may be designed with multiple temperature zones or separate hot and cold portions. In such a configuration, the heat pump 342 may transfer heat from the data center 330 to the hot portion of the thermal storage 344. The cold portion can be used to provide cooling to the data center 330. In an example, the cold storage portion may provide cooling to the data center 330 and the hot storage portion may store heat from the heat pump 342 to moderate spikes in heat provided by the data center 330. This arrangement may allow for more efficient heat transfer and storage, as well as provide flexibility in managing temperature differentials within the system 300. The thermal storage 344 may also incorporate insulation and other features to minimize heat loss and maintain temperature stability over extended periods.

The heat pump 342 may receive electrical power from multiple sources within the system 300, allowing for flexible and efficient operation. In some implementations, the heat pump 342 may be powered directly by the renewable energy source (RES) 310. This arrangement may allow the heat pump 342 to operate even when the CAES system is not actively generating power. Alternatively, or in addition, the heat pump 342 may draw power from the generator coupled to the expander train 326. This configuration may be particularly advantageous during periods when the CAES system is actively generating electricity, as it may allow for a more efficient use of the energy stored in the compressed air. In some cases, the heat pump 342 may be designed to switch between these power sources dynamically, based on factors such as the current output of the RES 310, the state of charge of the compressed air storage, and the overall energy demand of the system 300. The ability to receive power from multiple sources may enhance the operational flexibility of the heat pump 342, potentially improving its ability to manage thermal energy flows within the system 300 under varying conditions.

In some aspects, the heat pump 342 may operate in conjunction with sensors and control systems to optimize the transfer of heat from the data center 330 to the thermal storage 344. These systems may monitor factors such as data center temperature, thermal storage capacity, and overall system energy demands to determine the most efficient heat transfer strategy. This intelligent management of thermal energy may help to balance the cooling needs of the data center 330 with the energy storage and utilization requirements of the system 300.

A heat processing system 350 may receive heat form the compressor train 322. The heat processing system 350 includes an absorption chiller 352 and a heat pump 354 that may process thermal energy from the compressor train 322 or the intercoolers of the compressor train 322 and/or an aftercooler downstream of the compressor train 322.

The absorption chiller 352 may be configured to provide cooling using heat generated by the compressor train 322 of the CAES system. Absorption chillers may utilize a thermal process to produce cooling, typically using heat as the primary energy input rather than mechanical energy. In some implementations, these systems may employ a refrigerant-absorbent pair, such as water and lithium bromide, where the refrigerant is vaporized and condensed in a cycle that removes heat from the environment. The process may involve several stages including generation, condensation, evaporation, and absorption, with the heat input driving the separation of the refrigerant from the absorbent and initiating the cooling cycle. In some cases, the system 300 may include a second on-site cooling load with a different business profile. In an example, the absorption chiller 352 provides cooling to a cold storage 360, such as a freezer or refrigerator. The absorption chiller 352 may also be configured to provide cooling to the data center 330, utilizing the heat generated by the compressor train 322 of the CAES system. In some implementations, this arrangement may supplement or partially replace traditional cooling methods for the data center 330, potentially improving overall system efficiency and reducing the electrical load required for cooling operations.

By supplementing or at least partially replacing traditional cooling methods for the data center 330, the system 300 can reduce or eliminate water usage of the data center 330. Conventional cooling systems for data centers use large amounts of water for cooling. Convention cooling systems often include wet cooling towers to reject heat removed from coolant that is circulated through the data center. By transferring heat from the data center 330 using the heat pump 342, the system 300 can forgo or greatly reduce use of water to cool the data center 330, or to remove heat from coolant circulating through the data center 330. The system 300 can include a closed coolant loop where coolant circulates through the data center 330 and gains heat, the heat pump 342 transfers heat from the heated coolant to the expander train 326 to cool the coolant and heat the expander train 326, and then the cooled coolant is recirculated through the data center 330. Some conventional cooling systems reject waste heat into the air using dry cooling fans. By using the heat pump 342 to transfer waste heat from the data center 330, the system 300 greatly reduces electricity usage of the data center 330 relative to systems including dry cooling fans.

The heat pump 354 may transfer heat generated by the compressor train 322 of the CAES system to a thermal energy storage 370 and/or an ethanol plant 380. The thermal energy storage 370 may serve as a versatile heat source for multiple components within the system. In some implementations, the stored thermal energy can be directed to the absorption chiller 352 to drive its cooling cycle, potentially enhancing the overall cooling capacity of the system. Additionally, the thermal energy storage 370 may provide heat to the expander train 326, particularly during periods when waste heat from other sources is insufficient. This arrangement may allow for more flexible operation of the CAES system, as the expander train 326 can draw upon the stored thermal energy to maintain optimal operating temperatures and efficiencies. In some cases, the thermal energy storage 370 may be designed with multiple temperature zones or separate sections to accommodate the different temperature requirements of the absorption chiller 352 and the expander train 326, potentially improving the overall energy utilization of the system. The ethanol plant 380 may utilize the heat transferred by the heat pump 354 in various stages of the ethanol production process. In some implementations, the heat may be used for preheating feedstock, maintaining optimal temperatures during fermentation, or in the distillation process to separate ethanol from water. The integration of waste heat from the CAES system into the ethanol production process may potentially improve the overall energy efficiency of the ethanol plant 380, reducing its reliance on external energy sources and potentially lowering production costs.

The heat pump 354 may upgrade the heat from the compressor train 322 in transferring the heat to the thermal energy storage 370 and/or the ethanol plant 380. Upgrading the heat refers to collecting the heat at a lower temperature and delivering the heat at a higher temperature. The heat pump 354 may utilize a thermodynamic cycle to elevate the temperature of the heat collected from the compressor train 322, allowing it to deliver thermal energy at a higher temperature to the thermal energy storage 370 and/or the ethanol plant 380, potentially increasing the usability and efficiency of the transferred heat for various industrial processes or energy storage applications.

In some implementations, the system 300 (with heat pump 354) may operate as a standalone power generation system without connection to a utility grid. The system 300 may operate independently from the utility grid, potentially enhancing its resilience to external power disruptions and fluctuations. This standalone configuration may allow for greater control over power quality and availability, potentially improving the reliability of electrical supply to critical loads such as the data center 330. Additionally, by operating separately from the utility grid, the system 300 may avoid transmission and distribution losses associated with long-distance power transmission, potentially increasing overall energy efficiency and reducing operational costs.

In some implementations, the system 300 may exchange electrical energy with the utility grid. The system 300 may provide excess electrical energy generated by the system 300 to the utility grid and may draw energy from the utility grid when electrical energy generated by the system 300 is insufficient. In some implementations, the system 300 may exchange electrical energy with the utility grid based on energy costs. In an example, the system 300 may receive electrical energy from the utility grid and store energy in compressed air when energy costs are lower, and provide electrical energy to the utility grid from compressed air when energy costs are higher. In some implementations, the system 300 may operate as a virtual power plant. In some implementations, the system 300 may operate as a virtual power plant. In some implementations, the system 300 may provide services such as frequency services or contingency power reserves to the utility grid. In some implementations, asymmetry between the capacity of the compressor train 322 and the expander train 326 provides opportunities for enhanced and extended energy arbitrage with the utility grid. The energy storage capabilities of the system 300 allows for energy to be stored when energy prices are low and released when energy prices are high. In an example, when the compression train 322 has greater capacity than the expander train 326, a larger reserve of compressed air can be built up during ordinary operation in periods when renewable energy prices are low or negative and then discharge this extra stored energy over multiple longer discharge periods. In an example, when the expander train 326 has a greater capacity than the compression train 322, more of the stored energy can quickly be converted to electricity over shorter discharge periods when wholesale electricity prices are higher than normal.

The three systems described (system 100, system 200, and system 300) share fundamental components and principles, allowing for integration and interchangeability of various elements across different implementations. In all three systems, a renewable energy source (RES) may provide electrical power to a co-located data center or other electrical load. The RES may include various combinations of solar panels, wind turbines, and other renewable energy technologies. Each system incorporates a compressed air energy storage (CAES) component, which may include a compressor train, compressed air storage, and an expander train. The compressor train may compress ambient air using excess power from the RES, storing it in the compressed air storage for later use. The expander train may then decompress the stored air to generate electrical power when needed. A heat exchange system may be present in all three configurations, typically including a heat pump. This system may transfer waste heat from the data center or electrical load to the expander train of the CAES system, improving overall system efficiency by utilizing waste heat for power generation while simultaneously reducing cooling demands of the data center.

In some implementations, the systems 100, 200, 300 are illustrations of a same system. Components or elements of the systems 100, 200, 300 can be implemented in the system illustrated, or in one or more of the other systems. For example, the heat processing system in system 300, including the absorption chiller and additional heat pump, may be adapted for use in systems 100 and 200. This could allow for more diverse utilization of waste heat, such as providing cooling to additional on-site loads or transferring heat to other industrial processes. In another example, the concept of using compressed air for direct cooling of the data center, as mentioned in system 300, may be applied to systems 100 and 200 as well, potentially reducing the electrical load required for cooling operations. In another example, the control systems and sensors described in system 300 for optimizing heat transfer and managing thermal energy may be implemented in systems 100 and 200 to enhance their operational efficiency and flexibility.

A number of implementations have been described. Nevertheless, it will be understood that various modifications may be made without departing from the spirit and scope of the disclosure. Accordingly, other implementations are within the scope of the following claims.

The invention claimed is:

1. A system comprising:

a renewable energy source (RES) configured to provide electrical power to a co-located data center;

a compressed air energy storage (CAES) system comprising:

compressed air storage configured to store compressed air;

a compressor train configured to receive electrical power from the RES to compress ambient air into the compressed air storage; and an expander train configured to decompress the compressed air from the compressed air storage to provide electrical power to the co-located data center; and a heat exchange system comprising a heat pump configured to transfer waste heat from the co-located data center to the expander train of the CAES system to heat the compressed air from the compressed air storage, wherein the heat pump upgrades the waste heat by collecting the waste heat at a lower temperature from the co-located data center and delivering the waste heat at a higher temperature to the expander train.

2. The system of claim 1, wherein the heat exchange system receives electrical power from one or more of the CAES system and the RES.

3. The system of claim 1, further comprising an absorption chiller configured to provide cooling using heat generated by the compressor train of the CAES system.

4. The system of claim 1, further comprising a second heat pump to transfer heat generated by the compressor train of the CAES system to one or more of a thermal energy storage and a heat load.

5. The system of claim 4, wherein the heat load comprises an ethanol or other process plant.

6. The system of claim 1, wherein the compressed air storage comprises one or more of a subterranean cavern, compressed air tanks, and liquid air tanks.

7. The system of claim 1, further comprising thermal storage configured to store heat received from the heat exchange system.

8. The system of claim 7, wherein the heat pump is configured to transfer heat from the thermal storage to the expander train of the CAES system.

9. The system of claim 1, further comprising storage to store a thermal transfer medium.

10. The system of claim 9, wherein the thermal transfer medium is heated using one or more of waste heat from the co-located data center and the heat pump.

11. The system of claim 9, wherein the storage includes a cold storage portion storing the thermal transfer medium at a lower temperature and a hot storage portion storing the thermal transfer medium at a higher temperature.

12. The system of claim 1, wherein the RES and the CAES system are configured to provide continuous electrical power to the co-located data center.

13. The system of claim 1, wherein the compressor train is sized differently than the expander train.

14. The system of claim 1, wherein the heat pump is configured to transfer heat from ambient air to the expander train of the CAES system to heat the compressed air from the compressed air storage.

15. The system of claim 1, the compressed air storage to provide the compressed air to the co-located data center to cool the co-located data center.

16. A system comprising:

a compressed air energy storage (CAES) system comprising:

compressed air storage configured to store compressed air;

a compressor train configured to receive electrical power from a renewable energy source (RES) to compress ambient air into the compressed air storage; and an expander train configured to decompress the compressed air from the compressed air storage to provide electrical power to a co-located data center; and a heat pump configured to transfer waste heat from the co-located data center to the expander train of the CAES system to heat the compressed air from the compressed air storage, wherein the heat pump upgrades the waste heat by collecting the waste heat at a lower temperature from the co-located data center and delivering the waste heat at a higher temperature to the expander train.

17. The system of claim 16, wherein the heat pump receives electrical power from one or more of the CAES system and the RES.

18. The system of claim 16, further comprising thermal storage including a hot storage portion to store heat from the heat pump and provide heat to the heat pump and a cold storage portion to cool the co-located data center.

19. A system comprising:

a renewable energy source (RES) configured to provide electrical power to a co-located data center and an air energy storage (AES) system comprising:

high-potential air storage configured to store high-potential air;

a first energy converter configured to receive electrical power from the RES to convert ambient air into high-potential air for storage in the high-potential air storage; and a second energy converter configured to convert potential energy of the high-potential air into electrical energy for the co-located data center; and a heat exchange system configured to transfer waste heat from the co-located data center to the second energy converter of the AES system to heat the high-potential air during conversion of the potential energy of the high-potential air into electrical energy, wherein the heat pump upgrades the waste heat by collecting the waste heat at a lower temperature from the co-located data center and delivering the waste heat at a higher temperature to the expander train.

20. The system of claim 19, further comprising thermal storage including a hot storage portion to store heat from the co-located data center provided by the heat exchange system.

21. The system of claim 19, wherein the first energy converter and the second energy converter are disaggregated such that heat from the first energy converter is not provided to the second energy converter.

22. The system of claim 21, wherein the first energy converter has greater capacity than the second energy converter.

23. The system of claim 22, wherein excess high-potential air or heat from the first energy converter is provided to a co-located industrial load.

24. The system of claim 1, wherein the system is configured to exchange electrical energy with a utility grid.

* * * * *